US010826372B2

(12) United States Patent
Søegaard et al.

(10) Patent No.: US 10,826,372 B2
(45) Date of Patent: Nov. 3, 2020

(54) MAGNET GEAR

(71) Applicant: GRUNDFOS HOLDING A/S, Bjerringbro (DK)

(72) Inventors: Allan Ivo Søegaard, Hobro (DK); Flemming Buus Bendixen, Hobro (DK); Alexandru Sorea, Aalborg (DK); Henrik Rassmusen, Rødkærsbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 58 days.

(21) Appl. No.: 16/306,714

(22) PCT Filed: Apr. 7, 2017

(86) PCT No.: PCT/EP2017/058402
§ 371 (c)(1),
(2) Date: Dec. 3, 2018

(87) PCT Pub. No.: WO2017/207148
PCT Pub. Date: Dec. 7, 2017

(65) Prior Publication Data
US 2019/0131862 A1    May 2, 2019

(30) Foreign Application Priority Data

Jun. 1, 2016  (EP) .................................. 16172465

(51) Int. Cl.
*H02K 51/00* (2006.01)
*H02K 1/24* (2006.01)
*H02K 1/27* (2006.01)
*H02K 16/02* (2006.01)

(52) U.S. Cl.
CPC ............. *H02K 51/00* (2013.01); *H02K 1/246* (2013.01); *H02K 1/276* (2013.01); *H02K 16/02* (2013.01)

(58) Field of Classification Search
CPC ........ H02K 1/246; H02K 16/02; H02K 1/276; H02K 51/00
USPC ......................................................... 310/114
See application file for complete search history.

(56) References Cited

U.S. PATENT DOCUMENTS

| 2010/0060091 A1* | 3/2010 | Nordgren ............... H02K 41/06 310/80 |
| 2010/0164422 A1* | 7/2010 | Shu ...................... H02K 21/029 318/540 |
| 2011/0037333 A1* | 2/2011 | Atallah ................ H02K 49/102 310/98 |
| 2011/0121669 A1* | 5/2011 | Lacour .................. H02K 7/116 310/51 |

(Continued)

FOREIGN PATENT DOCUMENTS

| DE | 32 22 450 A1 | 6/1983 |
| DE | 42 23 815 A1 | 1/1994 |
| DE | 197 43 380 C1 | 3/1999 |

(Continued)

*Primary Examiner* — Alex W Mok
(74) *Attorney, Agent, or Firm* — McGlew and Tuttle, P.C.

(57) ABSTRACT

The magnetic gear includes a magnetic force generator (8), a driving shaft (1), a driven shaft (2) and a gear carrier (3) which are magnetically coupled in movement to one another. Only one magnetic force generator (8) is provided, which one magnetic force generator (8) has a north-south alignment that runs in the axis direction (111) of a shaft (1, 2) or parallel to this.

17 Claims, 6 Drawing Sheets

(56) References Cited

U.S. PATENT DOCUMENTS

2011/0163623 A1\* 7/2011 Rens .................. H02K 51/00
310/114

FOREIGN PATENT DOCUMENTS

| DE | 10 2008 060 284 A1 | 6/2010 |
|----|--------------------|--------|
| DE | 10 2013 213 569 A1 | 1/2015 |
| EP | 0 715 397 A2 | 6/1996 |
| WO | 2015/197067 A1 | 12/2015 |

\* cited by examiner

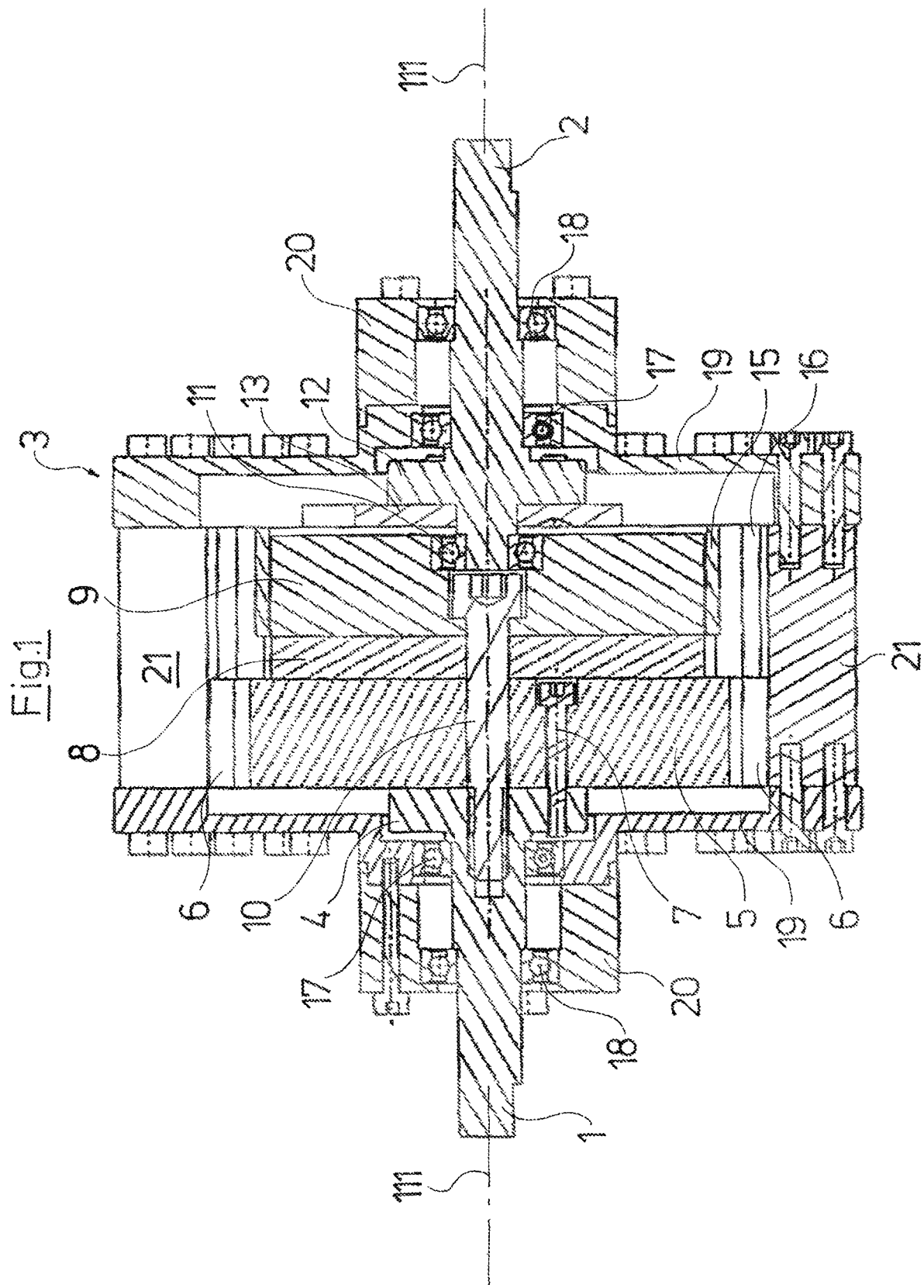

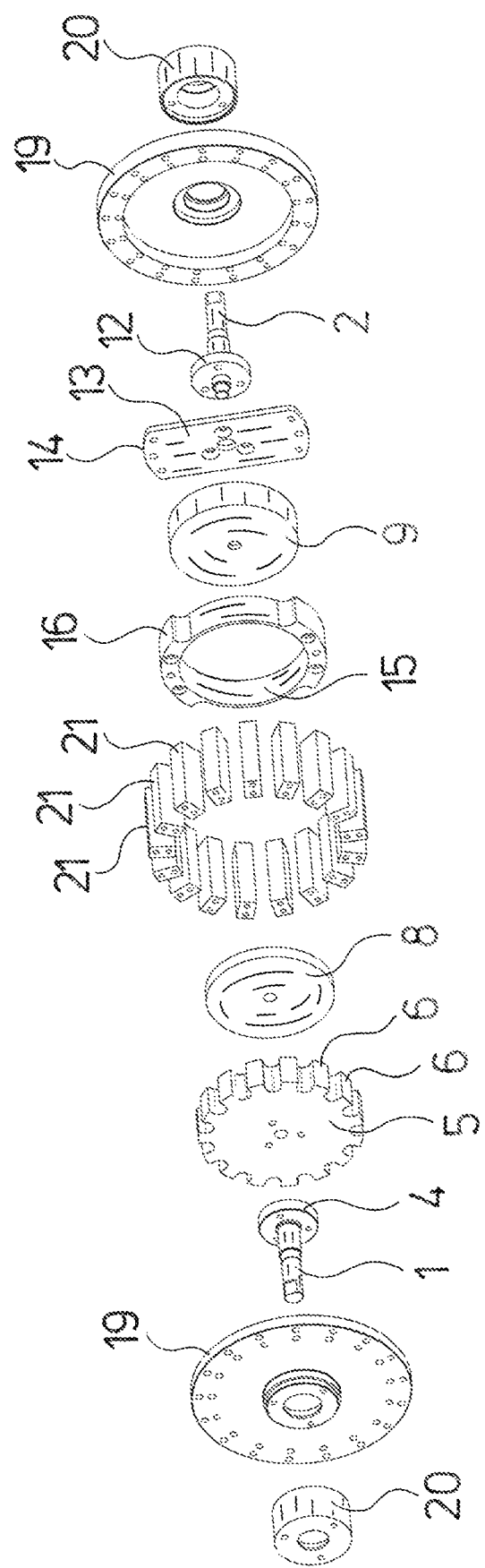

Fig.5
Fig.6
Fig.7
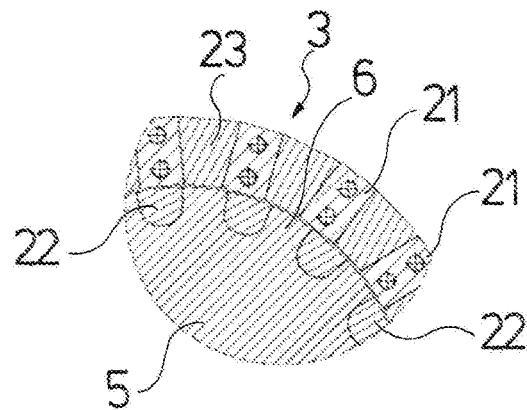
Fig.8   Fig.9   Fig.10
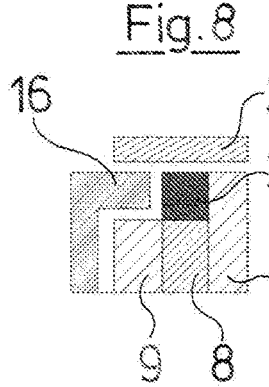 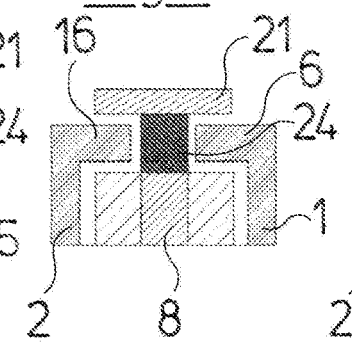 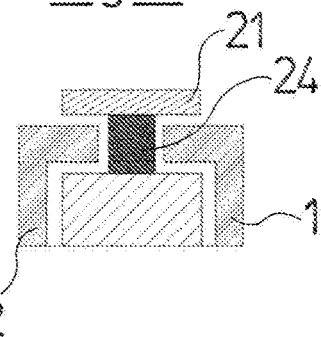
Fig.11   Fig.12
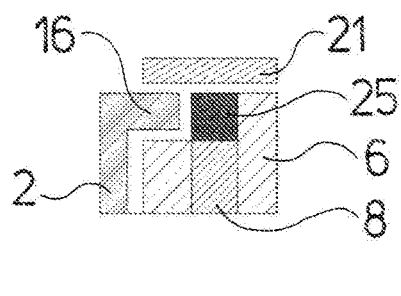 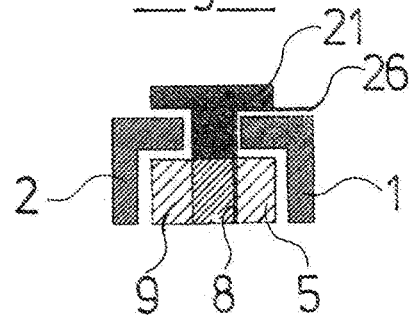

MAGNET GEAR

CROSS REFERENCE TO RELATED APPLICATIONS

This application is a United States National Phase Application of International Application PCT/EP2017/058402 filed Apr. 7, 2017, and claims the benefit of priority under 35 U.S.C. § 119 of European Application 16 172 465.3, filed Jun. 1, 2016, the entire contents of which are incorporated herein by reference.

TECHNICAL FIELD

The invention relates to a magnet gear, in particular to a reluctance gear, with a magnetic force generator, with a driving shaft, with a driven shaft and with a gear carrier, which are magnetically coupled in movement to one another.

BACKGROUND

Magnetic gears for some time now have been counted as belonging to the state of the art and are preferably applied where a spatial separation between the drive input and drive output is necessary, such as for example when handling chemical or radioactive substances. A significant advantage of such magnetic gears however is not only the possible separation between the drive input and drive output but, disregarding the bearings, the absence of wear, since the gear parts which are coupled to one another can be coupled to one another in a contact-free manner. The application of such magnetic gears in the past has however been limited to special applications, since the moments to be transmitted by them were comparatively small.

Such magnetic gears are becoming more significant due to the further development of magnets, in particular with the availability of powerful neodymium magnets and SMC (soft magnetic composite) materials, with which the magnets can be designed in a practically free manner with regard to their shape and polarization, and this increasing significance is due to the fact that the torque to be transmitted and the design possibilities, have been very considerably increased. Apart from the possible spatial separation between the drive input and drive output, a further advantage is the fact that every magnetic gear also simultaneously contains an overload protection. Specifically, if an unallowably high torque were to be present at one of the gear connections, then the magnetic flux is broken down, by which means the gear connection, thus the non-positive fit between the drive input and output and vice versa, is interrupted.

The multitude of the permanent magnets which are mostly arranged peripherally on the gear wheels as well as their assembly is quite cost intensive with magnetic gears.

The basic construction of such a magnetic gear is described in DE 10 2008 060 284 A1. A magnetic series gear is known from DE 42 23 815 A1, with which a multitude of magnets is likewise arranged peripherally of the gear wheels, and the magnetic flux of these magnets is led via soft-magnetic stator laminations and the gear housing. A magnetic gear which is likewise equipped with two magnetic rotors and which is constructed in a compact manner is known from WO 2015/197067 A1. This design is particularly suitable for applications with which the drive input and output must be hermetically separated from one another. The number of magnets which are to be installed however is high, which is always very costly and can create problems on assembly.

So-called reluctance gears which are essentially based of the effect that a magnetic circuit behaves such that it always forms the lowest magnetic resistance, is more favorable inasmuch as this is concerned. There, it is essentially reluctance forces and less the Lorenz forces which act, and attempt to close the magnetic circuit, so that its resistance becomes minimal.

Such a reluctance gear is known from DE 10 2013 213 569 A1 (FIG. 6). With the gear which is described there by way of FIG. 6, four permanent magnets are provided on the inner rotor, whose polarization is directed in pairs radially inwards and outwards in an oppositely lying manner. These magnets interact with a ring, in which pole rods are arranged, said pole rods transmitting the magnetic flux from the rotor onto an outer rotor surrounding the ring with the pole rods. The magnetic circuit is closed by a central magnetizable shaft of the inner motor which is magnetically coupled to the outer rotor at the face side.

SUMMARY OF THE INVENTION

Against this background, it is an object of the invention to design a magnetic gear, in particular reluctance gear, in a manner such that it can be inexpensively manufactured and is effective in operation.

The magnetic gear according to the invention, in particular reluctance gear, comprises a magnetic force generator, a driving shaft, a driven shaft and a gear carrier which are magnetically coupled in movement to one another. According to the invention, only one magnetic force generator is provided, whose north-south alignment at least in sections runs in the axis direction of a shaft or parallel to this.

The basic concept of the magnet gear according to the invention is to apply only one magnetic force generator, for example a single magnet, by which means the construction is simplified, the manufacturing costs reduced, and a very compact gear design can be achieved. The north-south alignment is in the axis direction of a shaft or parallel to this, only in sections, or also over the complete cross section and/or over the completer axial length, depending on the magnetic force generator.

The terms driving shaft, driven shaft and gear carrier in the context of the present invention serve essentially for the conceptual differentiation of these components, but not their functionality. It is to be understood that these three gear parts are moveable relative to one another, similarly as is the case with a 3-shaft planetary gear. Thereby, according to the invention, the drive can also be effected via the driven shaft, wherein the drive output is then effected via the driving shaft. In this case, it is a stepping-down and not a stepping-up which results. The gear carrier can be arranged in a stationary or movable manner and a different speed transfer ratio (transmission or gear ratio) between the driving shaft and driven shaft also results from this. The gear carrier itself can also form the driven shaft and then the driven shaft which is only indicated as such can be arranged in an either freely rotatable or fixed manner. This is explained in detail by way of an embodiment example which is explained further below.

Concerning the design, it is particularly advantageous that the magnetic force generator is connected to the driving shaft, and the magnetic force generator or a first magnetic conductor axially connecting thereto and magnetically connected to this comprises a number Z1 of magnetically effective, radial projections. The polarization of the magnet which is aligned in the axis direction of the gear is redirected or deflected in the radial direction into the region of the projections by way of this design arrangement.

The driven shaft is advantageously connected to an annular magnetic conductor which surrounds the magnetic force generator or a second magnetic conductor connected to this magnetic force generator, said first mentioned annular magnetic conductor being magnetically connected to but mechanically separated from this magnetic force generator or second magnetic conductor connected thereto. This first mentioned annular magnetic conductor comprises a number Z2 of magnetically effective radial projections, so that a deflection of the magnetic flux from the radial into the axial direction or vice versa is also ensured at the driven shaft side.

The gear carrier advantageously comprises a number Z3 of elements leading the magnetic flux and these elements are arranged annularly and peripherally of the radial projections Z1 and Z2. These elements conduct which is to say lead the magnetic flux from the radial projections of the magnetic force generator or a magnetic conductor connecting thereto, to the projections of the magnetic conductor of the driven shaft. These elements form pole rods and are advantageously designed in a rod-like manner, and are also called modulators. This annular and peripheral arrangement of the pole rods/modulators is particularly advantageous, since heat arises with the transfer of the magnetic flux from a drive-side (input-side) radial projection via a pole rod to a driven-side (output-side) radial projection, and this heat is quasi captured in the gear with known magnetic gear designs, whereas with the annular and peripheral arrangement described above, it is typically dissipated outwards at the gear carrier or a housing connected thereto and thus over a large surface, without the inner structure of the gear which as a rule is heat-sensitive being noticeably influenced.

According to an advantageous design of the invention, the magnetic force generator is formed by a disc-like or ring-like permanent magnet, whose middle axis coincides with the axis of a shaft. Such a disc-like or ring-like permanent magnet is particularly inexpensive in manufacture, amongst other things, due to the fact that the magnetization is relatively simple. In particular, a highly effective magnetic gear transmitting high moments can be created with only one magnet in particular with the use of a modern magnet which is formed from neodymium.

Such a disc-like or ring-like permanent magnet can be advantageously constructed in a segmented manner or from part-magnets of an equally directed polarity which are arranged next to one another, in particular with a larger construction type. What is decisive is the fact that the magnetic effect is such as with the case of a single permanent magnet polarized in one direction, specifically parallel to a rotation axis. The permanent magnet can therefore be constructed in a quasi mosaic-like manner, and thus does not therefore need to necessarily consist of one component.

Moreover, with regard to the permanent magnet or the part-magnets, it does not necessarily need to be the case of conventional magnets, but these in contrast can also be magnets which are constructed in a laminated manner, as is counted as belonging to the state of the art.

The permanent magnet or the part-magnet is preferably encapsulated in a protective manner. The magnet and the gear can also be applied in aggressive surroundings, amid the application e.g. of a rust-free steel casing or jacket.

According to an advantageous design of the invention, one envisages the permanent magnet or the permanent magnet formed from part-magnets being peripherally surrounded by an electrical coil, said electrical coil being able to be subjected to current from outside the gear. The magnetic force of the magnet can be electromagnetically assisted and therefore increased by way of this, by which means greater torques can be transmitted, and also different torques can be transmitted, depending on the current subjection of the coil. In particular, if the magnetic gear according to the invention is to serve as an overload protection or as a load limiter, then this load limit can be set in a quasi infinite manner within limits by way of suitably subjecting the coil to current.

According to the invention, one alternatively envisages forming the magnetic force generator by an electromagnet or a superconductor or providing these at least as part of the magnetic force generator. Such a design can be highly effective, but requires further design measures or the provision of suitable environmental conditions (in particular with the use of a superconductor). The subjection of rotating components to current is however familiar to the man skilled in the art. Thus alternating current or—preferably—direct current can be used in the present invention.

In a particular variant of the invention, the magnetic force generator consists of a permanent magnet as well as the electromagnet or superconductor. This variant provides good control possibilities.

A particularly advantageous and compact design of the gear results if the driving shaft and the driven shaft are aligned to one another and are arranged with the same axis as the gear carrier.

Concerning the design, it is particularly advantageous if the magnetic force generator is connected to the driving shaft, and the magnetic force generator or a magnetic conductor axially connecting thereto and magnetically connected to this comprises a number Z1 of magnetically effective, radial projections. The polarization of the magnet which is aligned in the axis direction of the gear is redirected or deflected in the radial direction into the region of the projections by way of this design arrangement.

The driven shaft is advantageously connected to a magnetic conductor which surrounds the magnetic force generator or a magnetic conductor connected to this magnetic force generator, said first mentioned magnetic conductor being magnetically connected to but mechanically separated from this magnetic force generator or magnetic conductor connected thereto. This first mentioned magnetic conductor comprises a number Z2 of magnetically effective radial projections, so that a deflection of the magnetic flux from the radial into the axial direction or vice versa is also ensured at the driven shaft side.

The gear carrier advantageously comprises a number Z3 of elements leading the magnetic flux and these elements are arranged annularly and peripherally of the radial projections Z1 and Z2. These elements conduct which is to say lead the magnetic flux from the radial projections of the magnetic force generator or a magnetic conductor connecting thereto, to the projections of the magnetic conductor of the driven shaft. These elements form pole rods and are advantageously designed in a rod-like manner, and are also called modulators. This annular and peripheral arrangement of the pole rods/modulators is particularly advantageous, since heat arises with the transfer of the magnetic flux from a drive-side (input-side) radial projection via a pole rod to a driven-side (output-side) radial projection, and this heat is quasi captured in the gear with known magnetic gear designs, whereas with the annular and peripheral arrangement described above, it is typically dissipated outwards at the gear carrier or a housing connected thereto and thus over a large surface, without the inner structure of the gear which as a rule is heat-sensitive being noticeably influenced.

The above mentioned arrangement with a number Z1 of magnetically effected radial projections on the one hand, a number Z2 of magnetically effective radial projections on the other hand as well as a number Z3 of elements which conduct the magnetic flux and which are arranged annularly and peripherally of the radial projections Z1 and Z2, is particularly advantageous with regard to design and can also be advantageously applied with several magnetic force generators, thus can basically also be applied independently of the design according to claim 1 of the present invention.

These elements which lead the magnetic flux are advantageously formed by radially inwardly directed, magnetically effective projections of a ring of magnetically conductive material. The discharge of heat to the outside is particularly favorable with this design. A very compact construction manner also arises, and this is very inexpensive in manufacture.

According to an advantageous design of the magnetic gear according to the invention, at least one element leading the magnetic flux is surrounded by an electrical coil. Such an electrical coil can be used for detecting the speed and/or torque of the gear carrier relative to the driving shaft and/or the driven shaft or however for producing electrical energy on operation of the gear. The production of electrical energy within the gear on operation of the gear is particularly advantageous, since the gear can then be designed with electronic devices which require no external electricity supply, which with rotating components always entails a certain design effort and thus costs. Thus for example electrically operated sensors or ones which are to be evaluated can be provided within the gear, and the detected or acquired data can be led to the outside via radio, without having to provided complicated lead connections for this.

A particularly advantageous design construction of the gear carrier results if two carrier discs which are arranged at a distance to one another and which are connected to one another by way of elements leading the magnetic flux are provided. These elements can advantageously be cuboid blocks from magnetically conductive material. The carrier discs should also be of magnetically conductive material, since special magnetic conductors would otherwise yet have to be provided, in order to magnetically integrate the elements leading the magnetic flux.

The driving shaft and the driven shaft are advantageously each rotatably mounted in a carrier disc of the gear carrier. Such an arrangement leads to an extremely compact constructional shape and has a high stability.

It is advantageous if the region between the radial projections is filled out with separating elements, for example of copper or aluminum, which are highly electrically conductive, so as to prevent a flux reversal. These electrically conductive separating elements advantageously can also be arranged between the elements leading the magnetic flux. Such an arrangement can be provided additionally or as an alternative.

The magnetic force generator, in particular the permanent magnet is advantageously surrounded by disc-like, magnetic conductors at both axial sides, in order to be able to keep the constructional height of the magnetic force generator to a minimum, but however is not to be restricted to this low construction height with regard to the design. The two disc-like magnetic conductors can be manufactured of the same material or of different materials, in order to thus be able to optimize the magnetic flux density, in particular to bring it to a maximum.

It is particularly advantageous if the magnetic gear with regard to its size is designed such that the distance of the elements leading the magnetic flux corresponds to their width in the peripheral direction. This means that the magnetic elements and the gaps which are formed therebetween are equally large.

The force of the magnetic force generator, as stated further above, can be increased by way of the arrangement of a coil surrounding the permanent magnet or also reduced, as can be required when starting up the gear for overcoming the cogging torque. Such means for the control of the magnetic flux however can also be provided in a purely mechanical manner, if for example, according to an advantageous further development of the invention, a ring of soft-magnetic material is envisaged, said ring being able to surround the element leading magnetic flux, in a complete or partial manner or not at all, if this is arranged is a suitably axially displaceable manner. The magnetic flux can thus be minimized, by which means the cogging torque of the gear is reduced, which simplifies the starting of the gear which is to say simplifies the start-up of the gear. This ring is usefully partly or completely retracted on operation, in order to then be able to transmit the maximal possible torque.

BRIEF DESCRIPTION OF THE DRAWINGS

In the drawings:

FIG. 1 is a longitudinal sectional view through a magnetic gear according to the invention, in a greatly simplified schematic representation;

FIG. 2 is an exploded representation of the essential components of the gear according to FIG. 1;

FIG. 5 is a view showing five cross-sectional shapes of radial projections;

FIG. 6 is a view showing five cross-sectional shapes of elements transmitting magnetic flux;

FIG. 7 is a schematically sectioned representation of the arrangement of electrical conductors between magnetic conductors;

FIG. 8 is a greatly schematically simplified representation showing a design variant of the magnetic gear;

FIG. 9 is a greatly schematically simplified representation showing another design variant of the magnetic gear;

FIG. 10 is a greatly schematically simplified representation showing another design variant of the magnetic gear;

FIG. 11 is a greatly schematically simplified representation showing another design variant of the magnetic gear;

FIG. 12 is a greatly schematically simplified representation showing another design variant of the magnetic gear;

DESCRIPTION OF PREFERRED EMBODIMENTS

Figure 4:
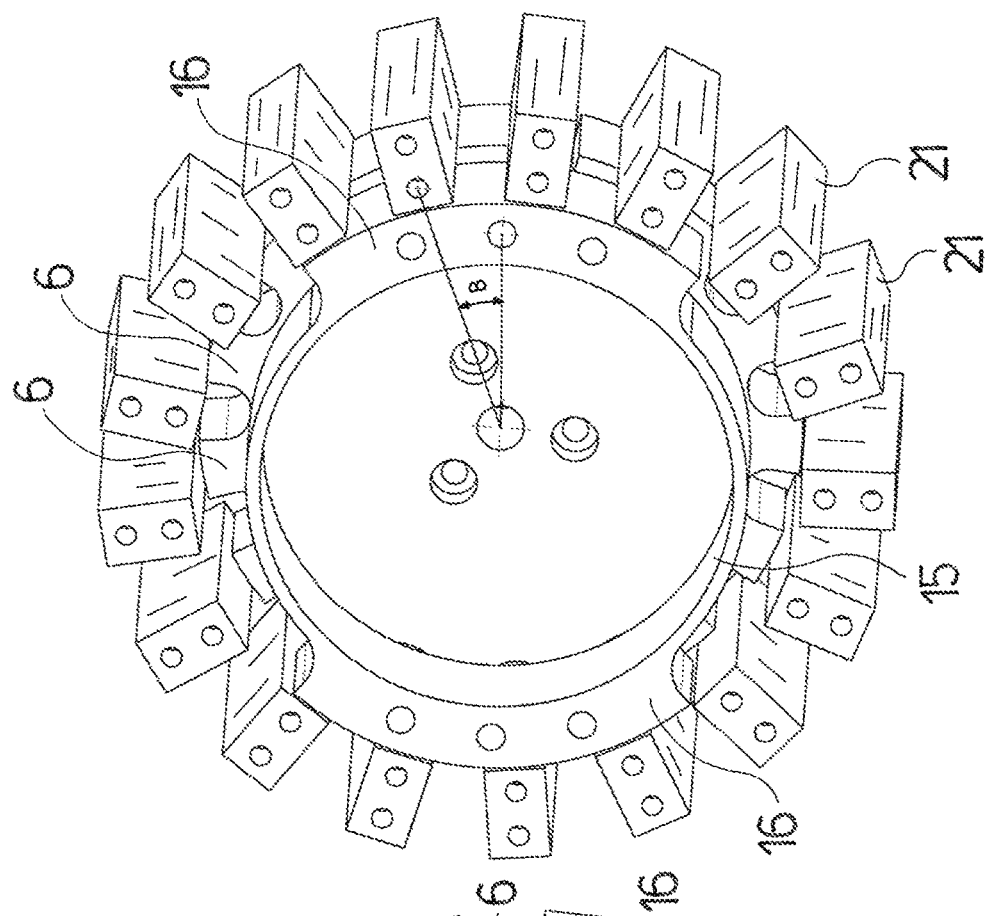
FIG. 4 is a schematic perspective representation of the arrangement according to FIG. 3, in the condition of the gear without force.

Referring to the drawings, the represented magnetic gear is a reluctance gear and comprises a driving shaft 1, a driven shaft 2 and a gear carrier 3 which are magnetically coupled to one another and rotate in a fixed ratio to one another. If the gear is to serve as a step-up gear, then the drive is effected by way of the driving shaft 1 which is coupled for example to a drive motor, wherein the drive output is selectively effected via the driven shaft 2 or the gear carrier 3 which is then accordingly designed for example as a hollow shaft, surrounding the driven shaft 2. A step-up from an input rotation speed of the driving shaft 1 to a higher output rotation speed of the driven shaft 2 or of the gear carrier 3 or the shaft connected thereto is effected with this arrangement, as will be explained in more detail further below. If the drive is effected via the shaft 2 or the gear carrier 3, thus if an electric motor is coupled to this side of the gear, then the gear functions as a step-down gear and the shaft 1 then forms the driven shaft.

The driving shaft 1 at its end which in the inside of the gear comprises a flange 4, on which a disc (a first magnetic conductor disc) 5 of magnetically conductive material bears, said disc comprising a number Z1 of radial projections 6 which project radially outwards beyond the cylindrical main body, similarly to the teeth of a gearwheel or cog. In the embodiment example, the disc 5 comprises seventeen teeth Z1 which, as is particularly evident from FIG. 2, project radially beyond the cylindrical main body of the disc 5 and whose width in the peripheral direction corresponds roughly to their peripheral distance to one another. This disc 5 in a manner aligned to threaded bores in the flange 4 comprises bores, through which the screws 7 are led, wherein the heads of these screws lie sunk within the disc 5, and with which screws the disc 5 is fastened on the flange 4 of the driving shaft 1.

The disc 5 comprises a central through-bore which is arranged aligned to a central threaded bore at the flange-side end of the driving shaft 1. A disc-like cylindrical magnet (a magnetic force generator) 8 connects to the disc 5 with the same axis, at the side which is away from the flange 4, and as well connecting to this magnet, a magnetically conductive, disc-like cylindrical body (second magnetic conductor) 9. The body 9, the magnet 8 and the disc 5 each comprise a central bore, and these bores are arranged aligned to one another. A screw 10 which passes through the bore and whose shank passes through the body 9, the magnet 8 and the disc 5, and which is fixed in the central threaded bore of the driving shaft 1, is seated in the body 9 in a sunken manner. This screw 10 thus fastens the disc 5, the magnet 8 and the body 9 on the flange 4 of the driving shaft 1 and fixedly connects these components to one another.

The magnet 8 in the represented FIG. 1 and which inasmuch as this is concerned is true to scale, has an axial length which corresponds roughly to a third of the axial length of the body 9 or the disc 5. Thereby, the longitudinal axis 111 of the body 9, of the magnet 8 and of the disc 5 coincides with the longitudinal and rotation axis 111 of the driving shaft 1, the driven shaft 2 and the gear carrier 3. The diameter of the magnet 8 and that of the body 9 are equally large, and smaller than the core diameter of the disc 5 at the foot of the radial projections (Z1) 6.

A bearing 11, in which the end of the driven shaft 2 which faces the inside of the gear is mounted in a rotatable manner with respect to the drive-side components, is sunk in the disc-like body 9 at the side which faces the driven shaft 2.

The driven shaft 2 likewise comprises a flange 12 which however is not arranged at the end, but at a distance to the end of the shaft 2 which is in the gear. A carrier 13 is connected via this flange 12 and via screws to the driven shaft 2 and is arranged at a slight distance to, but separated from the body 9, but however projects radially beyond this at diametrically opposite sides. The carrier 13 is connected in this projecting region 14 to an annular body (annular magnetic conductor) 15 surrounding the body 9 with slight play.

This annular body 15 comprises radial projections (Z2) 16 and the number Z2 of these radial projections 16 is two with the embodiment example. The annular body 15 in the region of its radial projections 16 is fixedly connected to the projecting region 14 of the carrier 13 by way of screws arranged parallel to the axis 111. The radial projections 16 extend over an angular region of 90°, so that the peripheral free spaces which are formed therebetween also extent over 90° of the periphery, as can also be particularly deduced from the FIGS. 2-4. At least the annular body 15 with its radial projections 16, but also the carrier 13 are likewise formed from magnetically conductive material.

The driving shaft 1 and the driven shaft 2 are mounted in a disc-like body 19 of the gear carrier 3, in each case via two bearings 17, 18, wherein the inner-lying bearings 17 are arranged within the disc-like body 19, whereas the outer bearings 18 are each arranged in a ring 20 which is screw-connected to the disc-like body 19.

The gear carrier 3 is arranged in a freely rotatable manner with respect to the shafts 1 and 2, via the bearings 17, 18. Elements (Z3) 21 which lead the magnetic flux between the radial projections 6 and the radial projections 16 and which are also indicated as pole rods or in their entirely as modulators, are provided between the disc-like bodies 19 of the gear carrier 3. These elements 21 in the represented embodiment are cuboid and extend so far in the longitudinal direction that they radially connect with a small distance onto the projects 6 as well as the projections 16. These elements 21 are arranged distributed on an imaginary ring at the same distance to one another, and have a width which corresponds to their distance to one another, specifically measured where they reach closest up to the projections 6 and 16, opposite which projections they are distanced with little play. The elements 21 in the embodiment represented by way of FIGS. 1-4 are connected to a disc-like body 19 in each case by way of two screws, so that a cage-like structure of the gear carrier 3 results.

The movement principle of the reluctance gear which is described above is based in the fact that the gear parts moveable to one another move such that a magnetic circuit, in which a magnetic flux is built up by the permanent magnets 8, is aligned or directed such that its magnetic resistance is minimal. The magnetic flux departing from the magnet 8 to the driving shaft 1 is transmitted onto the magnetically conductive disc 5 and there undergoes a deflection by 90° in the direction of one or more of the radial projections 6. This magnetic flux is then transmitted from the radial projections 6 onto one or more of the elements 21 depending on the position of the gear carrier 3, and from there in turn onto one or more of the radial projections 16. The magnetic flux gets from the radial projections 16 to the cylindrical disc body 9 and from there back to the magnet 8, by which means the magnetic circuit is closed.

The sum of the torques between the driving shaft 1, driven shaft 2 and gear carrier 3 is always zero. The speed transfer ratio (gear ratio) of the gear results from the ratio of the radial projections 6 (Z1—number of the radial projections 6), of the radial projections 16 (Z2—number of radial projections 16) and the elements 21 (Z3—number of the elements 21) and specifically as follows:

The speed transfer ratio between the drive input and drive output corresponds to the ratio Z2 to Z1, wherein Z3 is equal to Z1 plus Z2. A speed transfer ratio of 1 to 7.5 results from this in the presently described embodiment example, which is to say that if the driving shaft 1 rotates once, the driven shaft rotates 7.5 times, assuming that the gear carrier 3 is fixed and does not co-rotate. Thereby, the driving shaft 1 and the driven shaft 2 rotate in opposite directions.

As specified initially, the gear can also be applied in the reverse direction, thus the drive input is effected via the shaft 2 and the drive output via the shaft 1 or via the gear carrier 3, similarly to that which is possible with a three-shaft planetary gear. Thereby, the following relations basically result:

The speed transfer ratio in the case of a non-rotating, thus fixed gear carrier 3 is thus as follows:

$$R_{gearcarrierfixed} = \frac{L}{H} = -D \cdot \frac{Z2}{Z1} \quad (1)$$

wherein
$R_{gearcarrierfixed}$ is the speed transfer ratio
L the speed of the driving shaft 1
H the speed of the driven shaft 2
D the rotation direction
1 if the driving shaft and driven shaft rotate in opposite directions,
−1 if the driving shaft and driven shaft rotate in the same direction
Z1 number of radial projections 6
Z2 number of radial projections 16
Z3 number of elements 21.

$$Z3 = Z1 + D \cdot Z2 \quad (2)$$

If the gear carrier 3 co-rotates, basically the follow relation must be fulfilled:

$$\frac{L-O}{H-O} = -D \cdot \frac{Z2}{Z1} \quad (3)$$

wherein
O is the speed of the gear carrier.

If the driven shaft 2 is fixed instead of the gear carrier, then the following speed transfer ratio results:

$$R_{drivenshaftfixed} = \frac{O}{H} = \frac{D \cdot Z2}{Z1 + D \cdot Z2} \quad (4)$$

The meaning and purpose of the drive is to increase or to reduce the speed of the driven side with respect to the drive side, which is to say to reduce or increase the moment to be transmitted. The following relation results with regard to the powers:

$$P_h + P_l + P_s = P_m \quad (5)$$

wherein
$P_h$ is the power of the driven shaft
$P_l$ the power at the driving shaft, and
$P_s$ the power at the gear carrier.
The resulting power $P_m$ is the power stored in the gear.

If one sets the power stored in the gear $P_m=0$, then the following equation comprising the torques results:

$$T_h \cdot H + T_l \cdot L + T_s \cdot O = 0 \quad (6)$$

wherein
$T_h$ is the torque at the driven shaft 2 and
$T_l$ the torque at the driving shaft 1 and
$T_s$ the torque at the gear carrier.
The following relation results if the gear carrier is fixed:

$$-T_h \cdot \frac{H}{L} = T_l \quad (7)$$

and the following relation if the driven shaft 2 is fixed:

$$-T_h \cdot \frac{H}{O} = T_s \quad (8)$$

Figure 3:
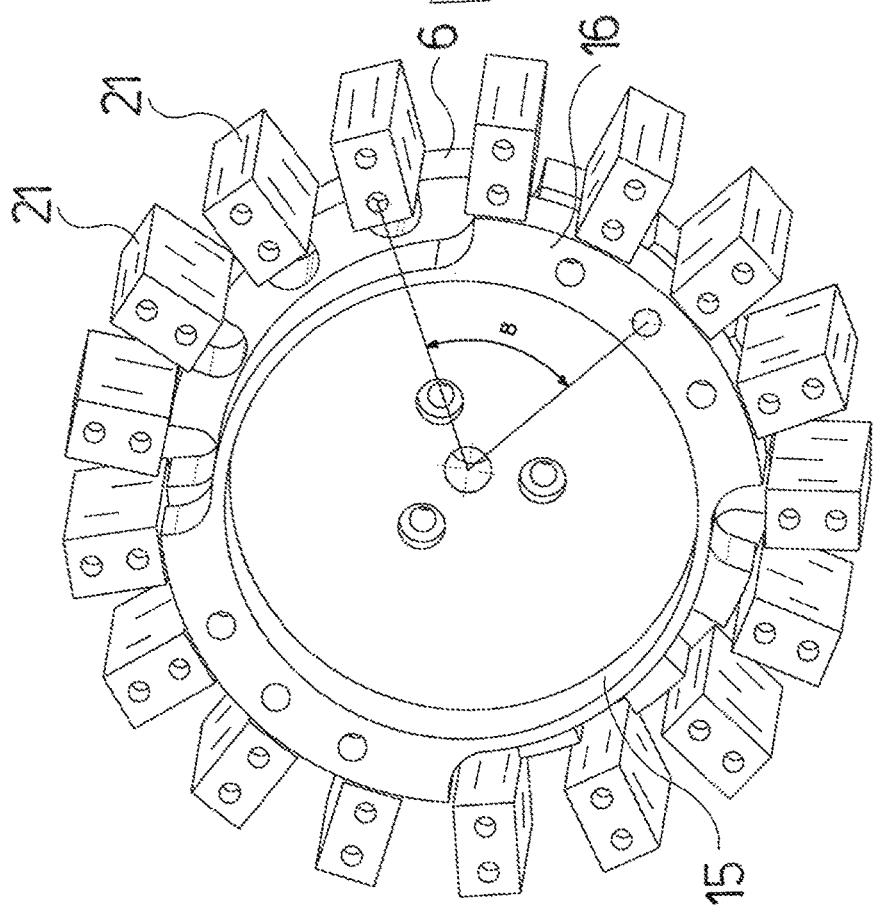
FIG. 3 is a schematic perspective representation showing the arrangement of the components which are magnetically engaged with one another, on transmitting the maximal torque.

As FIGS. 3 and 4 indicate, the angle B between a radial projection 16 and an element 21 is relatively small in the force-free condition, which is to say when no external forces act upon the gear, as is represented in FIG. 4. The magnetic gear in this force-free condition can be operated in both directions. This angle B however significantly increases, as is represented by way of FIG. 3, when the magnet gear transmits the maximal possible torque. The gear is then fixed in the direction of rotation.

Different cross-sectional shapes of the radial projections 6 and 16, as can be applied in order to influence the torque course, are represented by way of FIG. 5. The so-called cogging effect, which is to say the pulsation of the gear can thus be largely reduced by way of rounding the projections, as is represented to the greatest extent in the far right representation of FIG. 5, but this can be to such an extent that the gear can then only be applied in one direction, for example as a step-up gear if the radial projections 16 have such a rounded shape, and not in the reverse direction. Corresponding designs can have the elements 21, and the cross-sectional shapes in the regions which lie opposite the radial projections 6, 16 are represented by way of example by way of FIG. 6. The radial projections 6, 16 and/or the elements 21 can be arranged in an obliquely set manner, similarly to that which is known in the state of the art when staggering rotors of electric motors, so as to reduce this cogging effect.

The magnetic flux within the gear can be bundled by way of electrical conductors being arranged either between the radial projections 6, 16 and/or between the elements 21. Electrical conductors 22 are arranged between the radial projections 6, and electrical conductors 23 between the elements 21, in FIG. 7, and these conductors consist of aluminum and prevent a magnetic flux from arising in this region, by which means the magnetic flux is bundled in the remaining regions and the transmittable torque is increased.

As to how the magnetic force of the magnet 8 can be varied and/or increased by way of an electric coil 24 being arranged in a manner surrounding this magnet and being suitably subjected to current, is schematically represented by way of FIG. 8. The current-subjection is created by a current generator which is not represented. If the current generator fails, the gear still continues to function, but a variation of the magnetic force is no longer possible.

FIG. 9 shows one embodiment variant, with which the magnet 8, the coil 24 and the elements 21, which is to say the gear carrier 3 are stationarily arranged, whereas the drive input and drive output are each arranged in a manner rotatable with these radial projections 6 and 16.

One embodiment variant corresponding to FIG. 9 is represented by way of FIG. 10, with which the permanent magnet 8 has been done away with and the magnetic force is produced exclusively by the electrical coil 24 with the electrically conductive material which is arranged therein.

It is represented in FIG. 11 as to how a bundling of the magnetic field which is produced by the permanent magnet 8 can be achieved by way of an electrically conductive ring 25 which is formed from copper, being arranged surrounding the magnet 8. The magnetic flux within the gear and with this, the torque which can be transmitted, can also be increased by way of this.

It is schematically represented by way of FIG. 12, as to how a part of the gear, specifically the drive shaft 1 and the disc 5 are separated from the remaining part of the gear by way of an encapsulation 26. This encapsulation 26 consisting of stainless steel and in the form of a separating wall 26 permits a part of the gear to be let running in another medium, as is necessary for example for the processing of chemical substances with stirrers or likewise.

Figures 13, 14:
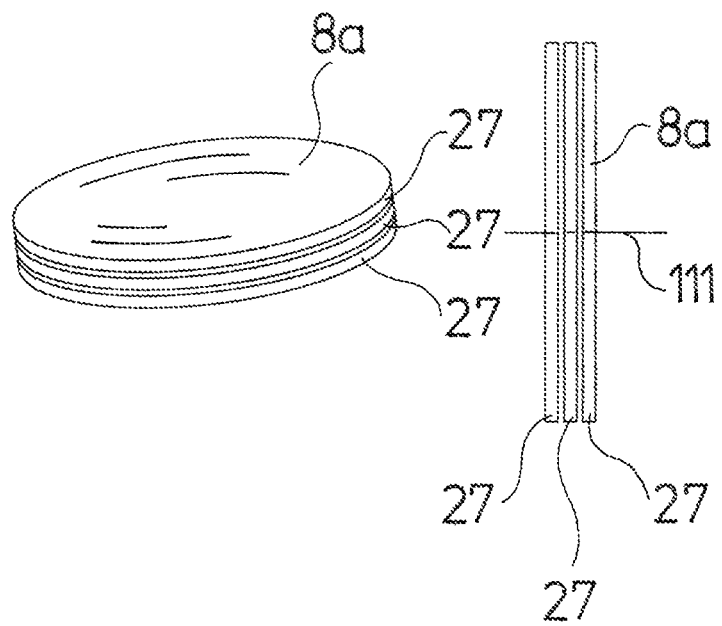
FIG. 13 is a greatly schematic simplified perspective representation of the construction of a laminated magnet.
FIG. 14 is a lateral view of the magnetic according to FIG. 13.

The permanent magnet 8 does not necessarily need to be a homogeneous cylindrical magnet body, as is represented by way of FIGS. 1 and 2, but it can thereby also be the case of a laminated magnet (magnetic force generator) 8a, as is represented by way of example by way of FIGS. 13 and 14, which is formed there from three individual magnet discs, as is counted as belonging to the state of the art.

Figures 15, 16:
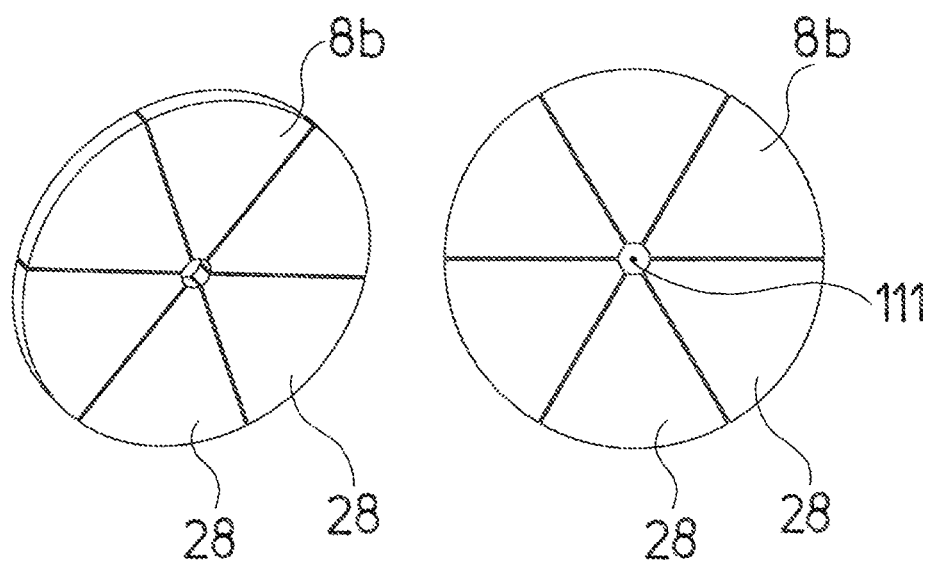
FIG. 15 is a greatly simplified perspective representation of the construction of a magnet formed from segments.
FIG. 16 is a plan view of the magnet according to FIG. 15.

An alternative design is a segmented magnet (magnetic force generator) 8b, as is represented by way of FIGS. 15 and 16. The magnet consist of six equally large segments 28 which, put together, result in a magnet 8b, which is polarized in a direction of its longitudinal middle axis 111 just as the case with the laminated magnet 8a.

Figure 17:
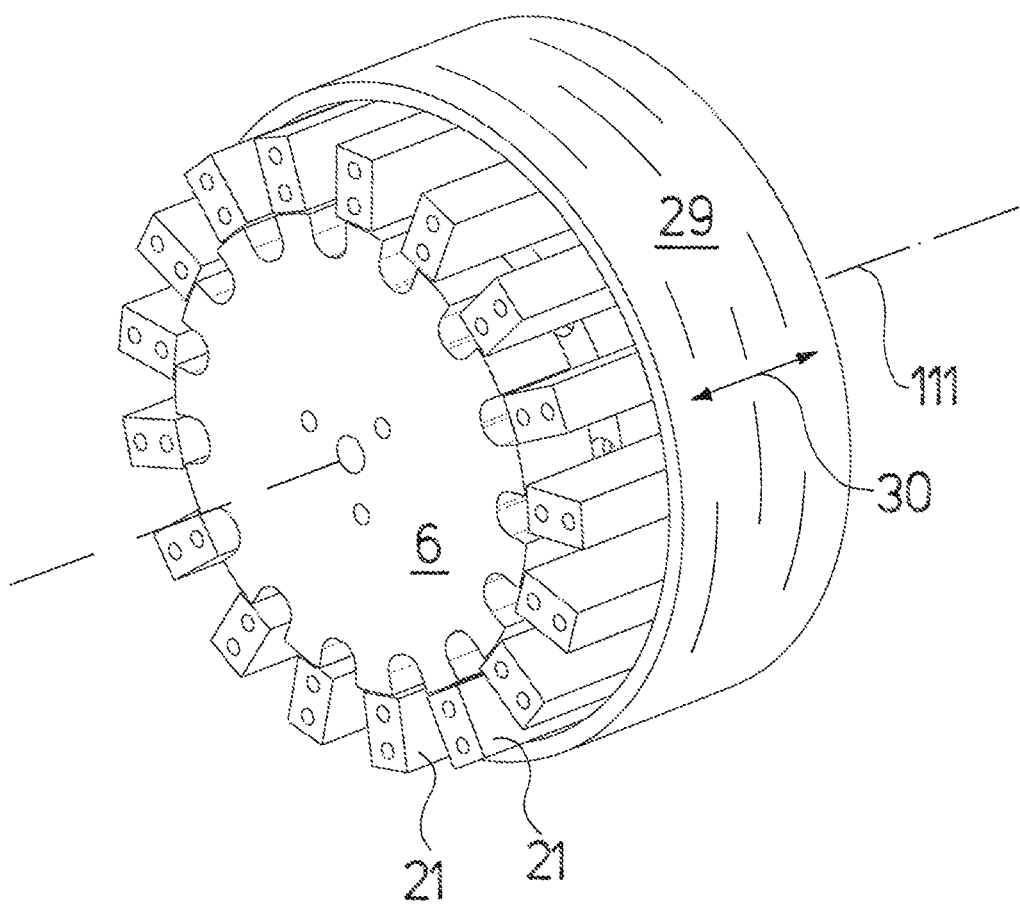
FIG. 17 is a schematic perspective representation showing an embodiment variant of the magnetic gear according to FIG. 1, with a soft-magnetic, axially displaceable ring.

It is represented by way of FIG. 17, as to how the transmittable torque can be influenced with the help of a soft-magnetic ring 29 which surrounds the elements 28 at a small distance. The ring 29 is displaceable within the gear in the direction of the axis 111, so that it can completely or partly (as is represented in FIG. 17) surround the elements 21, or not at all. The displacement directions are symbolized in FIG. 17 by the double arrow 30. This ring 29 is formed from soft-magnetic material and surround the elements 21 in the manner of a jacket, but does not contact them. The ring 29 is utilized for the control of the magnetic flux from the magnetic force generator 8. If the ring 29 covers the elements only by half as is represented in FIG. 17, then the magnetic flux is only slightly weakened. If the ring 29 is pushed over completely, so that it peripherally covers the elements 21, then the magnetic flux is greatly weakened. This arrangement is advantageous in the cases when the starting of the gear is problematic due to the cogging torque. The cogging torque is reduced when the ring 29 peripherally surrounds the elements 21, so that the start-up of the gear is simplified. This ring 29 can be retracted gain after the gear is in motion, so that the magnetic flux is then maximal and the torque which can be transmitted by the gear is maximal.

The invention claimed is:

1. A magnetic gear comprising:
only one magnetic force generator;
a driving shaft;
a driven shaft;
a gear carrier, the driven shaft and the driving shaft being magnetically coupled in movement to one another, the only one magnetic force generator having a north-south alignment at least in sections that runs in an axis direction of at least one of the shafts or parallel to the axis direction of at least one of the shafts;
a first magnetic conductor being axially and magnetically connected to the magnetic force generator;
a second magnetic conductor being connected to the magnetic force generator; and
an annular magnetic conductor, wherein:
the driving shaft is connected to the magnetic force generator;
the magnetic force generator or the first magnetic conductor comprises a first number of magnetically conducting radial projections;
the driven shaft is connected to the annular magnetic conductor;
the annular magnetic conductor surrounds the magnetic force generator or surrounds the second magnetic conductor;
the annular magnetic conductor is magnetically connected to and mechanically separated from the magnetic force generator or the second magnetic conductor;
the annular magnetic conductor comprises a second number of magnetically conducting radial projections;
the gear carrier comprises a third number of elements which lead the magnetic flux between the radial projections and which are arranged annularly and peripherally of the radial projections.

2. A magnetic gear according to claim 1, wherein the magnetic force generator is formed by a disc or ring permanent magnet having a middle axis that coincides with an axis of one of the shafts.

3. A magnetic gear according to claim 2, wherein the magnetic force generator is segmented or is constructed of part-magnets of an equally directed polarity, said part-magnets being arranged next to one another.

4. A magnetic gear according to claim 3, wherein the magnetic force generator or the part-magnets are encapsulated into a rust-free steel encapsulation.

5. A magnetic gear according to claim 2, wherein the magnetic force generator or the part-magnets is/are laminated.

6. A magnetic gear according to claim 1, wherein the magnetic force generator is peripherally surrounded by an electrical coil which can be subjected to current from outside the gear.

7. A magnetic gear according to claim 1, wherein the magnetic force generator comprises an electromagnet or a superconductor.

8. A magnetic gear according to claim 1, wherein the driving shaft and driven shaft are aligned to one another and that the gear carrier is arranged axially to the alignment.

9. A magnetic gear according to claim 1, wherein the third number of elements leading the magnetic flux are formed by radially inwardly directed, magnetically effective projections of a ring of magnetically conductive material.

10. A magnetic gear according to claim 1, wherein at least one the third number of elements leading the magnetic flux is surrounded by an electric coil.

11. A magnetic gear according to claim 10, wherein the at least one electric coil is used for detecting a speed and/or a torque of the gear carrier, with regard to the driving shaft and/or the driven shaft.

12. A magnetic gear according to claim 1, wherein the gear carrier comprises two carrier discs which are distanced to one another and which are connected to one another by way of the third number of elements leading the magnetic flux.

13. A magnetic gear according to claim 12, wherein the driving shaft and the driven shaft are each rotatably mounted in a carrier disc.

14. A magnetic gear according to claim 1, further comprising electrically conductive separating elements of copper or aluminum are arranged between the radial projections and/or between the third number of elements leading the magnetic flux.

15. A magnetic gear according to claim 1, wherein disc magnetic conductors are arranged at both axial sides of the magnetic force generator.

16. A magnetic gear according to claim 1, wherein a distance of the third number of elements leading the magnetic flux corresponds to a width thereof, in the peripheral direction.

17. A magnetic gear according to claim 1, wherein means for the control of the magnetic flux are provided comprising a ring of soft-magnetic material which surrounds the third number of elements leading the magnetic flux and which is arranged in an axially displacably.

\* \* \* \* \*